(12) United States Patent
Elisson et al.

(10) Patent No.: US 6,453,098 B2
(45) Date of Patent: *Sep. 17, 2002

(54) REINFORCED OPTICAL FIBER CABLE OF UNITUBE STRUCTURE

(75) Inventors: Peter Elisson, Hickory, NC (US); Jörgen Paborn, Ambjornarp (SE)

(73) Assignee: Alcatel, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/567,133

(22) Filed: May 8, 2000

Related U.S. Application Data

(63) Continuation of application No. 08/987,841, filed on Dec. 9, 1997, now Pat. No. 6,091,871.

(30) Foreign Application Priority Data

Dec. 9, 1996 (FR) .............................. 96 15085

(51) Int. Cl.⁷ ................................. G02B 6/44
(52) U.S. Cl. ..................................... 385/113
(58) Field of Search ................ 385/113, 107, 385/109–111, 114; 264/1.28, 1.29

(56) References Cited

U.S. PATENT DOCUMENTS

| | | |
|---|---|---|
| 4,232,935 A | 11/1980 | Rohner et al. |
| 4,278,835 A | 7/1981 | Jackson |
| 4,730,894 A * | 3/1988 | Arroyo |
| 4,765,712 A | 8/1988 | Bohannon, Jr. et al. |
| 4,896,940 A | 1/1990 | Kathiresan et al. |
| 4,974,926 A | 12/1990 | Blee et al. |
| 5,013,127 A | 5/1991 | Bernard |
| 5,029,974 A | 7/1991 | Nilsson .................. 385/113 |
| 5,113,468 A | 5/1992 | Baker |
| 5,289,556 A | 2/1994 | Rawlyk et al. |
| 5,448,670 A * | 9/1995 | Blew et al. .............. 385/112 |
| 5,651,081 A * | 7/1997 | Blew et al. .............. 385/101 |

FOREIGN PATENT DOCUMENTS

| | | |
|---|---|---|
| DE | 3309996 A1 | 9/1984 |
| EP | 0361863 A1 | 4/1990 |
| EP | 0696750 A1 | 2/1996 |

OTHER PUBLICATIONS

Patent Abstracts of Japan, vol. 012, No. 100 (P–683), Apr. 2, 1998 corresponding to JP 62 231915 A (Sumitomo Electric Ind Ltd), dated Oct. 12, 1987.

* cited by examiner

*Primary Examiner*—Rodney Bovernick
*Assistant Examiner*—Michael J. Stahl
(74) *Attorney, Agent, or Firm*—Sughrue Mion, PLLC

(57) ABSTRACT

The reinforced optical fiber cable of unitube structure comprises a protective tube for protecting optical fibers and reinforcing elements, together with an outer sheath around said protective tube. In the cable said protective tube is of corrugated tubular structure. Application: Long distance transmission cable.

14 Claims, 1 Drawing Sheet

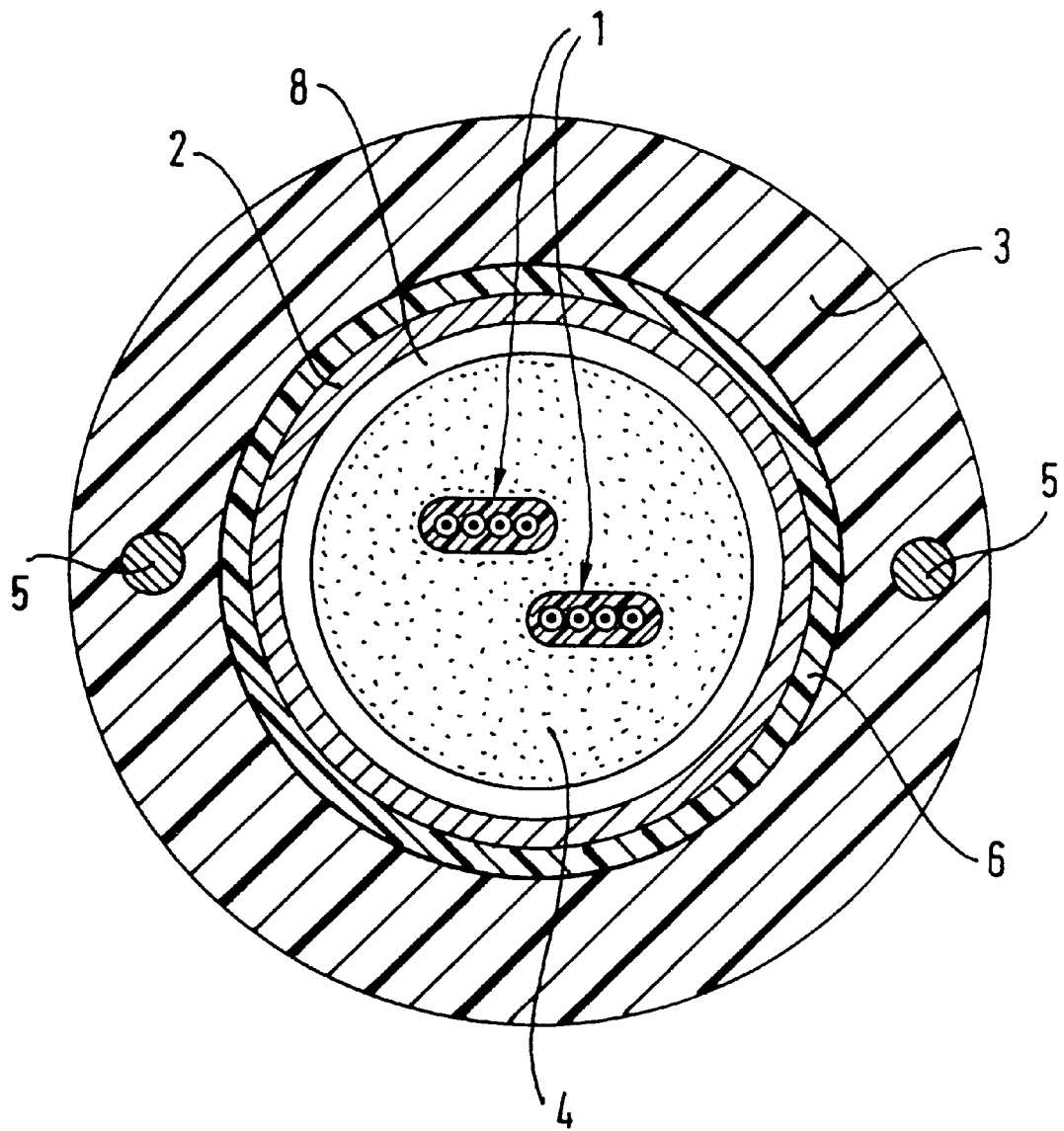

REINFORCED OPTICAL FIBER CABLE OF UNITUBE STRUCTURE

This is a continuation of application Ser. No. 08/987,841 filed Dec. 9, 1997, now U.S. Pat. No. 6,091,871 the disclosure of which is incorporated herein by reference.

The present invention relates to a reinforced optical fiber cable of unitube structure comprising a protective tube containing the optical fibers, reinforcing elements around the protective tube, and an outer sheath.

BACKGROUND OF THE INVENTION

Such a cable is intended in particular for long distance data transmission.

Document EP-A-0 696 750 discloses a cable of that type, in which the optical fibers, whether independent from one another or assembled together in at least one ribbon, are contained inside a protective tube of plastic together with a filler material for filling the tube. The reinforcing elements of the tube are made of a plastics material that is reinforced by reinforcing fiber and known as FRP material, and they are cabled on the protective tube by being assembled to one another. The outer sheath of the tube is extruded over the reinforcing elements once they are in place.

To manufacture such a cable, the optical core defined by the protective tube containing the optical fibers and the filler material is often made initially on a first manufacturing line, while the reinforcing elements are made and put into place around the optical core, with the outer sheath being simultaneously extruded thereabout, on a second line for cable manufacture proper. The differences between the materials of the protective tube and of the sheath in particular mean that stresses can be generated while the extruded sheath is cooling, which stresses are then transmitted to the protective tube and are liable to affect the fibers contained in said protective tube. As a result, the cable is made in two stages and manufacture is lengthy, thereby causing the cost of the cable to be relatively high.

OBJECT AND SUMMARY OF THE INVENTION

An object of the present invention is to provide an optical fiber cable of a structure that avoids those problems so as to enable it to be made in a single stage.

The invention provides a reinforced optical fiber cable of unitube structure comprising a protective tube for protecting optical fibers and reinforcing elements around said protective tube together with an outer sheath, wherein said protective tube is of corrugated tubular structure.

Additionally and advantageously:
- the corrugated tubular structure is constituted by a transversely corrugated metal strip that is deformed longitudinally into a tube, or is made of a plastics material and is extruded;
- the reinforcing elements include a reinforcing layer between said corrugated tubular structure and said outer sheath and/or cords that are strong in traction embedded in the outer sheath parallel to the axis of the cable, being disposed diametrally opposite one another in pairs and close to a diametral plane of said cable.

BRIEF DESCRIPTION OF THE DRAWING

The characteristics and advantages of the invention appear from the following description of an embodiment given by way of preferred example and illustrated in the sole FIGURE of the accompanying drawing.

The sole FIGURE is a section view through a cable of the invention. The cable comprises: optical fiber ribbons 1, or in a variant mutually independent optical fibers; a corrugated tubular structure 2 around the ribbons; and an outer sheath 3 extruded around the tubular structure 2. Preferably, the inside space in which the optical fiber ribbons are received contains a filler material 4 serving in particular to protect the optical fibers against penetration of moisture. The filler material is a material which stops water and thus prevents it penetrating, or is a material which swells in the presence of water.

MORE DETAILED DESCRIPTION

In the embodiment shown, the cable has cords or rods 5 that are relatively stiff and that have high traction strength, which are embedded in the sheath, parallel to the axis of the cable. By way of example, these cords may be made of reinforced plastics material or of steel. There are two such cords in the embodiment shown, in which they are opposite each other. In a variant, there could be four of them, in which case they would be symmetrical in pairs about a diametral plane of the cable being at a small distance from said plane.

The cable advantageously also includes a reinforcing layer 6 between the tubular structure 2 and the outer sheath 3. This reinforcing layer may be constituted by wires or elements having high traction strength, e.g. made of aramid, glass fibers, or FRP material, which are wound helically around the corrugated tubular structure 2. In a variant, the reinforcing layer may also be constituted by an annular layer extruded around the corrugated tubular structure and preferably filled with reinforcing fibers.

In this cable, the corrugated tubular structure 2 is strong enough against radial stresses to serve simultaneously during manufacture as a support for the extruded sheath and any reinforcing layer without running any risk for the optical fibers housed therein. Reference 8 designates a corrugation of the corrugated tubular structure 2, not in section and situated behind the section plane.

This corrugated tubular structure is made from a metal strip which is corrugated transversely and rolled longitudinally to put it into the form of a tube as it advances along the line. In a variant, it may be made of a plastics material and it may be extruded directly as a corrugated tube around the fibers. As it advances down the line, it receives internally the optical fiber ribbons or the optical fibers and also the filler material, and externally it receives any reinforcing layer and the extruded outer sheath provided with its reinforcing cords. The resulting optical fiber cable is of unitube overall structure and it is thus obtained directly in a single step, ignoring the manufacture of the optical fiber ribbons when the optical fibers are in ribbon form.

What is claimed is:

1. A reinforced optical fiber cable of unitube structure comprising a protective tube for protecting optical fibers, and reinforcing elements and an outer sheath disposed around said protective tube,
    wherein said protective tube is a corrugated metallic tubular member formed from a metal strip which is corrugated transversely and rolled longitudinally along an assembly line to form the protective tube,
    and wherein, during the protective tube's advance along the assembly line, said protective tube directly receives said optical fibers internally therein, and externally said reinforcing elements and said outer sheath extruded around said protective tube.

2. A cable according to claim 1, wherein said reinforcing elements comprise high traction strength cords embedded in said outer sheath and disposed parallel to an axis of said cable and diametrically opposite in pairs and in the vicinity of a diametrical plane of said cable.

3. A cable according to claim 1, wherein said reinforcing elements comprise a reinforcing layer.

4. A cable according to claim 3, wherein said reinforcing layer includes elements that are strong in traction wound helically around said corrugated tubular member.

5. A cable according to claim 3, wherein said reinforcing layer is constituted by an annular layer of plastics material extruded around said corrugated tubular member.

6. A cable according to claim 1, including a filler material in said corrugated tubular member.

7. A cable according to claim 6, wherein said filler material is a material which swells in the presence of water.

8. A reinforced optical fiber cable of unitube structure comprising a protective tube for protecting optical fibers, and reinforcing elements and an outer sheath disposed around said protective tube, wherein said protective tube is a corrugated plastic tubular member extruded directly as a corrugated tube around said optical fibers along an assembly line to form the protective tube, and wherein, during the protective tube's advance along the assembly line, said protective tube receives externally said reinforcing elements and said outer sheath extruded around said protective tube.

9. A cable according to claim 8, wherein said reinforcing elements comprise high traction strength cords embedded in said outer sheath and disposed parallel to an axis of said cable and diametrically opposite in pairs and in the vicinity of a diametrical plane of said cable.

10. A cable according to claim 8, wherein said reinforcing elements comprise a reinforcing layer.

11. A cable according to claim 10, wherein said reinforcing layer includes elements that are strong in traction wound helically around said corrugated tubular member.

12. A cable according to claim 10, wherein said reinforcing layer is constituted by an annular layer of plastics material extruded around said corrugated tubular member.

13. A cable according to claim 8, including a filler material in said corrugated tubular member.

14. A cable according to claim 13, wherein said filler material is a material which swells in the presence of water.

\* \* \* \* \*